Sept. 18, 1962 L. M. COBB 3,054,916
SINGLE PHASE BRUSHLESS MOTOR
Filed Feb. 24, 1961 2 Sheets-Sheet 1

INVENTOR.
LYNN M. COBB
BY
ATTORNEY

Sept. 18, 1962 L. M. COBB 3,054,916
SINGLE PHASE BRUSHLESS MOTOR
Filed Feb. 24, 1961 2 Sheets-Sheet 2

INVENTOR.
LYNN M. COBB
BY
ATTORNEY

United States Patent Office 3,054,916
Patented Sept. 18, 1962

3,054,916
SINGLE PHASE BRUSHLESS MOTOR
Lynn M. Cobb, 500 Woodcrest Road,
Huntingdon Valley, Pa.
Filed Feb. 24, 1961, Ser. No. 91,553
7 Claims. (Cl. 310—154)
(Granted under Title 35, U.S. Code (1952), sec. 266)

The invention described herein may be manufactured and used by or for the Government of the United States of America for governmental purposes without the payment of any royalties thereon or therefor.

This invention relates to a synchronous motor and more particularly to a single phase, alternating current synchronous motor.

Several types of motors using single phase, alternating current electric power are in existence today. Most of these motors fall into one of the following categories:

The shaded pole type motor in which the necessary phase shift of flux is obtained by short circuiting a coil turn around a portion of the pole face.

A second type motor effects a phase shift in one of two windings by including in each of the two windings resistance-reactance characteristics which are different from one another.

A third type motor known as the capacitor-start induction-run type employs two windings physically separated with a capacitor in the circuit of the starting winding, which is deenergized by a centrifugal switch after having reached a certain speed.

A fourth motor is known as repulsion-start induction-run type. This type of motor has a winding and a commutator on the rotor and a winding on the stator. Upon starting the armature winding produces a flux which reacts with the flux of a portion of the field to produce a torque as a result of commutator brushes being short circuited and shifted with respect to the field.

Each of these types of motors and variations of them require at least one of the following elements: multiple coils and windings, a commutator, slip rings, brushes, centrifugal devices, capacitors, inductances, and complex stampings.

The present invention contemplates a single phase alternating current motor which employs a single coil wound about the rotor but anchored to the stator as the only circuit element and by virtue of its unique construction eliminates the necessity for a commutator, slip rings, and brushes. The motor of the present invention utilizes no capacitors, inductances or centrifugal devices and is of a simple construction.

Therefore, an object of the present invention is to provide a motor which utilizes single phase alternating current as a source of power, and which is of a simpler construction than presently known single phase alternating current motors.

Another object of the present invention is to provide a synchronous motor which utilizes single phase alternating current as a source of power, and which by virtue of its unique construction eliminates the need for a commutator, slip rings, and brushes.

A further object of the invention is the provision of a single phase alternating current synchronous motor which has a single coil as its only electrical component, and which eliminates the necessity for multiple coils or windings, centrifugal devices, capacitors and inductances.

Other objects and advantages of the present invention will become apparent in the detailed disclosure of the specification and drawings which illustrate a preferred embodiment and wherein.

Figure 1:
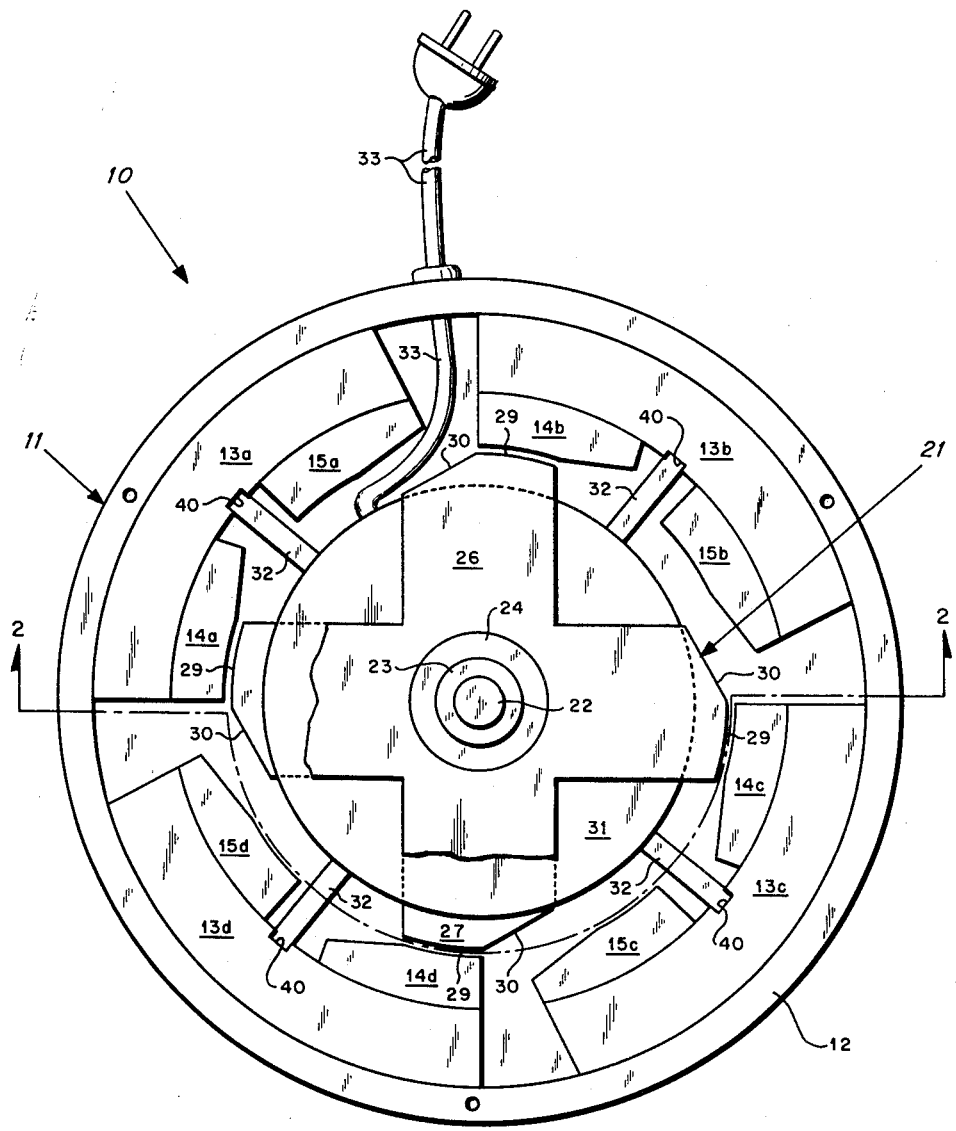
FIG. 1 illustrates a top elevational view of the motor with the cover plate removed.

There is shown in FIG. 1 a motor 10 having a stator 11 and a rotor 21. The stator 11 is constructed of an outer cylindrical motor frame 12 which has rigidly affixed thereto four equally sized and equally spaced blocks 13a through 13d of magnetic material, which are contoured to the inner walls of the frame 12 and extend throughout the longitudinal length of the frame 12. Each of the blocks 13a through 13d has rigidly mounted thereon two permanent magnets 14a and 15a through 14d and 15d, respectively. Each of the permanent magnets 14a and 15a through 14d and 15d extends throughout the length of the blocks 13a through 13d, respectively.

Figure 3:
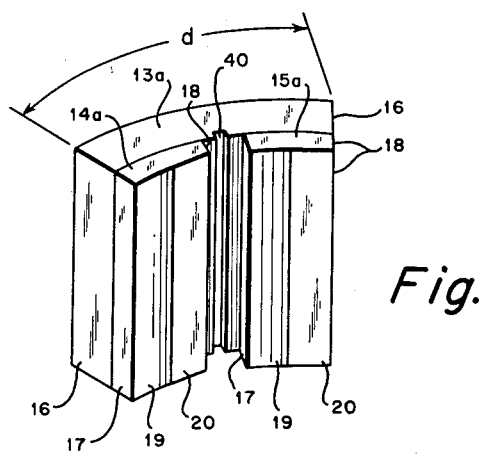
FIG. 3 is a pictorial representation of one of the stator pole assemblies.

FIGS. 1 and 3 are referred to hereinbelow. Since each of the four blocks 13a through 13d and the permanent magnet pole faces 14a through 14d and 15a through 15d, respectively, are identical in structural relationships, only the structural relationships of permanent magnets 14a, 15a, and block 13a need be discussed in detail.

Block 13a is mounted on and follows the contour of frame 12. Block 13a is of a constant radial thickness and has edge portions 16 as shown. Permanent magnets 14a and 15a are rigidly attached to the block 13a, and the arcuate length of permanent magnets 14a, 15a are each approximately equal to ⅖ of the arcuate length d of the block 13a. Permanent magnet 14a is mounted on block 13a such that its edge portion 17 is in alignment with one of the edges 16 of block 13a as shown best in the drawing. The edge portion 18 of permanent magnet 15a is in alignment with the other edge portion 16 of block 13a.

Each of the permanent magnets 14a and 15a forms an irregularly shaped pole face on the internal side of each. Starting with edge portion 17 of permanent magnet 14a and proceeding in a clockwise direction looking at FIG. 1, it is seen that the first half 19 of the internal surface of permanent magnet 14a is arcuate in shape concentric with the longitudinal axis of shaft 22 while the second half of the internal surface of permanent magnet 14a forms a sloping portion 20 which meets and forms with edge portion 18 an angle approximately equal to 105 degrees. Permanent magnet 15a forms a pole face and the internal surface thereof is identical in configuration to that of 14a with the exception, it is the edge portion 18 of permanent magnet 15a which is aligned with the edge portion 16 of block 13a. The pole faces defined by the internal portion of permanent magnets 14b through 14d and 15b through 15d are identical in shape to their respective counterparts of 14a and 15a, and for that reason will not be discussed in detail.

Referring to FIGS. 1 and 3, it is seen that rotor 21 comprises a shaft 22 which extends longitudinally through the cylindrical frame 12 of the motor 10 and is rotatably supported in the bushings 23 which may be of any conventional type. An annular core 24 is concentrically mounted around shaft 22 for rotation therewith.

Attached to opposite ends of shaft 22 for rotation therewith are cross shaped pole pieces 26 and 27. Pole pieces 26 and 27 are magnetically connected at opposite ends of core 24 and form with core 24 a low reluctance flux path.

Pole piece 26 is composed of four arms which have a common juncture with shaft 22 from which each of the arms extends radially and at right angles to one another. The outer periphery of each arm of pole piece 26 forms a pole face which is to some degree complementary to the pole faces formed by the permanent magnets 14a and 15a through 14d and 15d. In other words, beginning with the edge of an arm as viewed in FIG. 1 and proceeding in a counterclockwise direction, it is seen that the first half of the outer periphery of each of the pole faces of each arm of pole piece 26 forms an arcuate surface 29 from the edge of the arm to a radial line extending from axis of shaft 22 concentric with the longitudinal axis of shaft 22. The second half of the pole face forms a planar sloping portion 30 which makes an angle of approximately 60 degrees with a radial line extending from the axis of shaft 22 and bisecting the pole piece 26. At the other end of core 24 is a second pole piece 27 which is identical in configuration to that of pole piece 26.

A solenoid coil 31 rigidly secured to the motor frame 12 as by struts 32 is mounted concentrically with core 24 so that core 24 is rotatable with respect to the solenoid coil 31. The struts 32 are rigidly secured to solenoid coil 32 and are placed in slots 40. The solenoid coil is easily removed from the motor as a unit, and thus may be replaced when it becomes defective. Further, the solenoid coil has a power cord or terminal 33 electrically conconnected to it and through which the motor receives its single phase alternating electric power.

Figure 2:
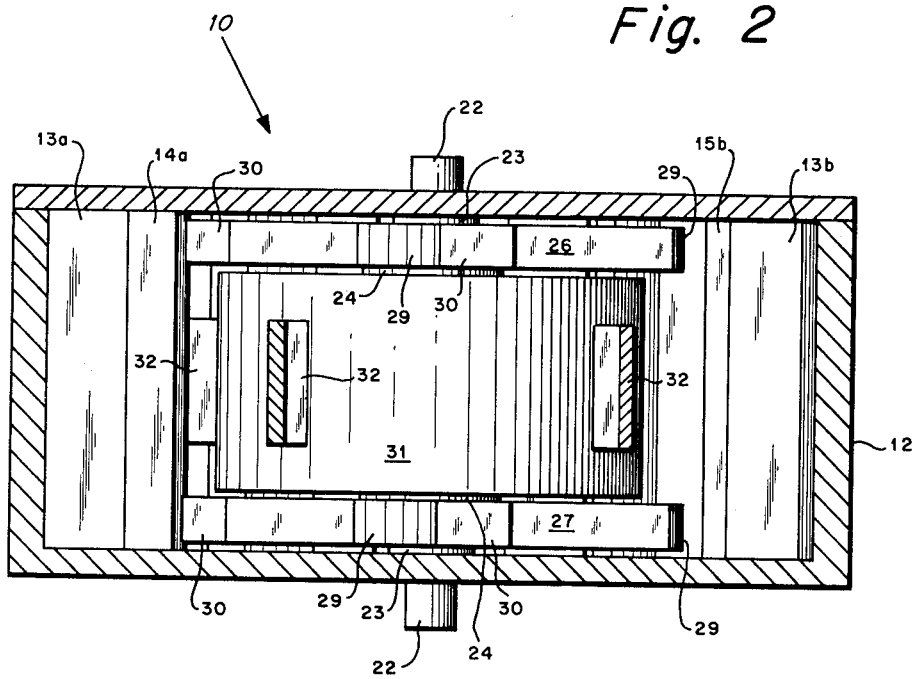
FIG. 2 shows a side view partly in section of the motor taken along line 2—2 of FIG. 1.

FIG. 2 illustrates a sectional side view of the preferred embodiment of this invention. By reference to FIG. 2 it is seen that the pole pieces 26 and 27 at either end are adjacent the extremities but within the longitudinal dimension of the permanent magnets.

The permanent magnets 14a through 14d all have a north pole at the end facing the viewer in FIG. 1 and a south pole at the opposite end thereof. The permanent magnets 15a through 15d all have a north pole on the end opposite that which faces the viewer in FIG. 1 and a south pole at the end facing the viewer of FIG. 1. The pole faces defined by the pole pieces 26 and 27 are alternately north and south poles depending on the phase of the alternating current applied to solenoid coil 31 by means of terminals 33.

Before alternating electric current is applied to coil 31, the rotor will be in a position as shown with the arcuate portions aligned. This occurs as a result of the magnetic flux linkages, which are greatest between the respective arcuate portions of the permanent magnets and pole pieces, because the air gaps at these points are shortest. This position is the determinant factor for the rotation of the rotor. Therefore, as a result of the specific pole face configuration, the rotor will necessarily rotate in the counterclockwise direction when coil 31 is energized with alternating electric power. For purposes of description of operation it will be assumed that the single phase alternating current power applied to the solenoid coil 31 through terminal 33 is in the proper half cycle to cause the pole faces of pole piece 26 to become at that moment south poles; while at the same time the pole faces of pole piece 27 become north poles. In the position shown the pole pieces 26, 27 and core 24 will remain stationary because the induced magnets of pole piece 26 are attracted to the north poles of the permanent magnets 14a through 14d, while the induced north poles of the pole piece 27 are attraced to the south poles of the permanent magnets 14a through 14d.

However, as the alternating current through the solenoid coil 31 reverses polarity on the next half cycle, the magnetic flux reverses direction within the core 24 and north poles are induced in the arms of pole piece 26 and south poles are induced in the arms of pole piece 27. The pole faces of pole piece 26 are repelled by the north poles of permanent magnets 14a through 14d, while the pole faces of the pole piece 27 are repelled by the south poles of the permanent magnets 14a through 14d. At the same time the pole faces of pole piece 26, which have become north poles, are attracted to the south poles of permanent magnets 15a through 15d, while the pole faces of pole piece 27 as south poles are attracted to north poles of permanent magnets 15d. Thus, counterclockwise rotation of the rotor 21 is begun. As the polarity of the induced magnetic poles on the rotor reverse on each half cycle of alternating current the above-described cycle is continuously repeated. As a result the rotor is stepped one pole successively on each half cycle and rotation is effected.

The rotation is begun in the counterclockwise direction due to the configuration of the pole pieces which causes arcuate portions of the stator and rotor to align as shown when coil 31 is not energized. The attracting forces in the counterclockwise direction are much greater than in the clockwise direction because of the much lesser air gap distance between the rotor magnets and the permanent magnets in the counterclockwise direction, as can be seen from the drawing.

Thus, this invention discloses a simplified structure for obtaining synchronous rotational motion utilizing single phase alternating electric power.

Obviously, many modifications and variations of the present invention are possible in the light of the above teachings.

What is claimed is:

1. In an electric motor: a stator including a plurality of elongated, permanently magnetized stator pole faces, each of said stator pole faces formed into an arcuate surface concentric with the rotational axis of said motor and extending throughout the first half of said stator pole face, each of said stator pole faces further formed into a stator planar portion extending throughout the second half of said stator pole face, said stator planar portion having a slope in the radial direction with at least two longitudinally parallel lines therein parallel to said axis, a rotor including an annular core concentrically mounted for rotation about said axis, said rotor including a pole piece at each end thereof, each of said pole pieces including an arm extending radially outward from said axis, each of said arms terminating in a rotor pole face, each of said rotor pole faces formed into an arcuate surface concentric with said axis and extending throughout the first half of said rotor pole face, each of said rotor pole faces further formed into a rotor planar portion extending throughout the second half of said rotor pole faces, said rotor planar portion having a slope in the radial direction with at least two longitudinally parallel lines therein parallel to said axis, a solenoid coil concentric with said axis and anchored to said stator.

2. A single phase alternating current electric motor, comprising in combination: a cylindrical housing, a plurality of elongated permanent magnets secured on the interior surface of said housing with the long dimensions parallel to the longitudinal axis of said housing, said permanent magnets terminating in stator pole faces at the surface thereof adjacent said axis, the first portion of each of said stator pole faces shaped into arcuate surfaces concentric with said axis, each of said arcuate surfaces extending from one edge of each of said permanent magnets to the respective radial lines extending from said axis and bisecting each of said permanent magnets, the second portion of each of said stator pole faces shaped into flat portions extending from the end of each of said arcuate surfaces to the other edge of each of said permanent magnets forming an obtuse angle therewith, a rotor for rotation within said housing, said rotor comprising a shaft mounted for rotation about said axis of said housing within said housing, an elongated annular core mounted concentrically on said shaft for rotation therewith, a pole piece attached at each end of said core for rotation therewith, each of said pole pieces comprising at least one arm extending radially outward from said core, each of said arms terminating in a rotor pole face, the first portion of each of said rotor pole faces shaped into arcuate surfaces concentric with said axis, each of said arcuate surfaces extending from one edge of each of said arms to the respective radial lines extending from said axis and bisecting each of said arms, the second portion of each of said rotor pole faces shaped into flat portions extending from the end of each of said arcuate surfaces to the other edge of each of said arms making an obtuse angle therewith, a solenoid coil anchored to said housing and mounted concentrically about said core between said rotor pole pieces, electric terminal means adapted to be connected to an alternating electric power source, means connecting said terminals to said solenoid coil whereby synchronous rotation of said rotor within said stator is effected.

3. In an electric motor: a stator, a rotor adapted to be rotated within said stator, said stator including a pair of elongated permanent magnets secured thereto with the long dimension thereof parallel to the axis of rotation of said rotor, each of said permanent magnets terminating at the surface thereof adjacent said axis in a stator pole face including an arcuate surface concentric with said axis, each of said arcuate surfaces extending from one edge of respective ones of said permanent magnets to the respective radial line extending from said axis and bisecting said respective ones of said permanent magnets, each of said stator pole faces further including a plane surface extending from the end of each of said arcuate surfaces to the other edge of said respective ones of said permanent magnets forming an obtuse angle therewith, said rotor including an annular core for rotation therewith about said axis, a pole piece secured to each end of said core for rotation therewith, each of said pole pieces including an arm extending radially outward from said core, each of said arms terminating in a rotor pole face, each of said rotor pole faces including an arcuate surface concentric with said axis, each of said arcuate surfaces extending from one edge of respective ones of said arms to the respective radial line extending from said axis and bisecting said respective ones of said arms, each of said rotor pole faces further including a plane surface extending from the end of each of said arcuate surfaces to the other edge of said respective ones of said arms forming an obtuse angle therewith, a solenoid cell concentric with said axis and secured to said stator between said rotor pole pieces.

4. In an electric motor: a stator, a rotor mounted for rotation within said stator, including an elongated, ferromagnetic block secured thereto with the long dimension thereof parallel to the axis of rotation of said rotor, a pair of elongated permanent magnets respectively secured at each end of said block with the long dimensions thereof parallel to said axis, each of said permanent magnets terminating in a stator pole face at the surface thereof adjacent said axis, each of said stator pole faces including an arcuate surface concentric with said axis, each of said arcuate surfaces extending from one edge of respective ones of said permanent magnets to the respective radial line extending from said axis and bisecting said respective ones of said permanent magnets, each of said stator pole faces further including a plane surface extending from the end of each of said arcuate surfaces to the other edge of said respective ones of said permanent magnets forming an obtuse angle therewith; said rotor including a core mounted for rotation about said axis, said core including a pole piece at each end thereof for rotation therewith, each of said pole pieces including an arm extending radially outward from said core, each of said arms terminating in a rotor pole face, each of said rotor pole faces including an arcuate surface concentric with said axis, each of said arcuate surfaces extending from one edge of respective ones of said arms to the respective radial line extending from said axis and bisecting said respective ones of said arms, each of said rotor pole faces further including a plane surface extending from the end of each of said arcuate surfaces to the other edge of said respective ones of said arms forming an obtuse angle therewith, coil means concentric with said axis and secured to said stator.

5. In an electric motor having a housing, an elongated ferromagnetic block secured to the interior surface of the housing with the long dimensions thereof parallel to the longitudinal axis of the housing, an elongated permanent magnet secured on the interior surface of said block at each end of said block with the long dimension parallel to said axis, said permanent magnets terminating in stator pole faces at the surface thereof adjacent said axis, the first portion of each of said stator pole faces shaped into arcuate surfaces concentric with said axis, each of said arcuate surfaces extending from one edge of each of said permanent magnets to the respective radial lines extending from said axis and bisecting each of said permanent magnets, the second portion of each of said stator pole faces shaped into flat portions extending from the end of each of said arcuate surfaces to the other edge of each of said permanent magnets forming an obtuse angle therewith, a rotor for rotation within said housing, said rotor comprising a shaft mounted for rotation about said axis of said housing within said housing, an elongated annular core mounted concentrically of said shaft for rotation therewith, a pole piece attached at each end of said core for rotation therewith, each of said pole pieces including an arm extending radially outward from said core, said arm terminating in a rotor pole face, the first portion of said rotor pole face shaped into an arcuate surface concentric with said axis, said arcuate surface extending from one edge of said arm to a radial line extending from said axis and bisecting said arm, the second portion of said rotor pole face shaped into a flat portion extending from the end of said arcuate surface to the other edge of said arm making an obtuse angle therewith, a solenoid coil anchored to the housing and mounted concentrically about said core, electric terminal means adapted to be connected to an alternating electric power source, means connecting said terminals to said solenoid coil whereby synchronous rotation of said rotor within said stator is effected.

6. A single phase alternating current synchronous motor, comprising in combination: a cylindrical housing, a plurality of elongated, equally-spaced poles of permanently magnetized material secured to the interior surface of said housing with the long dimensions thereof parallel to the longitudinal axis of said housing, each of said poles terminating in a stator pole face at the surface thereof adjacent said axis, the first portion of each of said stator pole faces shaped into arcuate surfaces concentric with said axis, each of said arcuate surfaces extending from one edge of each of said permanent magnets to the respective radial lines extending from said axis and bisecting each of said permanent magnets, the second portion of each of said stator pole faces shaped into flat portions extending from the end of each of said arcuate surfaces to the other edge of each of said permanent magnets forming an obtuse angle therewith, a rotor for rotation within said housing, said rotor comprising a shaft mounted for rotation about said axis of said housing within said housing, an elongated annular core mounted concentrically on said shaft for rotation therewith, a pole piece attached at each end of said core for rotation therewith, each of said pole pieces comprising four arms extending radially outward from said core at right angles to each other, each of said arms terminating in a rotor pole face, the first portion of each of said rotor pole faces shaped into arcuate surfaces concentric with said axis, each of said arcuate surfaces extending from one end edge of each of said arms to the respective radial lines extending from said axis and bisecting each of said arms, the second portion of each of said rotor pole faces shaped into flat portions extending from the end of each of said arcuate surfaces to the other edge of each of said arms making an obtuse angle therewith, a solenoid coil anchored to said housing and mounted concentrically about said core between said rotor pole pieces, electric terminal means adapted to be connected to an alternating electric power source, means connecting said terminals to said solenoid coil whereby synchronous rotation of said rotor within said stator is effected.

7. A single phase alternating current electric motor, comprising in combination: a cylindrical housing, a plurality of elongated blocks secured to and equally-spaced about the interior surface of said housing with the long dimensions thereof parallel to the longitudinal axis of said housing, each of said blocks being equal in size and composed of magnetic material, an elongated permanent magnet secured on the interior surface of said blocks at each end of each of said blocks with the long dimensions parallel to said axis, said permanent magnets terminating in stator pole faces at the surface thereof adjacent said axis, the first portion of each of said stator pole faces shaped into arcuate surfaces concentric with said axis, each of said arcuate surfaces extending from one edge of each of said permanent magnets to the respective radial lines extending from said axis and bisecting each of said permanent magnets, the second portion of each of said stator pole faces shaped into flat portions extending from the end of each of said arcuate surfaces to the other edge of each of said permanent magnets forming an obtuse angle therewith, a rotor for rotation within said housing, said rotor comprising a shaft mounted for rotation about said axis of said housing within said housing, an elongated annular core mounted concentrically on said shaft for rotation therewith, a pole piece attached at each end of said core for rotation therewith, each of said pole pieces comprising four arms extending radially outward from said core at right angles to each other, each of said arms terminating in a rotor pole face, the first portion of each of said rotor pole faces shaped into arcurate surfaces concentric with said axis, each of said arcuate surfaces extending from one edge of each of said arms to the respective radial lines extending from said axis and bisecting each of said arms, the second portion of each of said rotor pole faces shaped into flat portions extending from the end of each of said arcuate surfaces to the other edge of each of said arms making an obtuse angle therewith, a solenoid coil anchored to said housing and mounted concentrically about said core, electric terminal means adapted to be connected to an alternating electric power source, means connecting said terminals to said solenoid coil whereby synchronous rotation of said rotor within said stator is effected.

References Cited in the file of this patent

UNITED STATES PATENTS

| | | |
|---|---|---|
| 1,904,692 | Martin | Apr. 18, 1933 |
| 2,469,834 | Maerz | May 10, 1949 |

FOREIGN PATENTS

| | | |
|---|---|---|
| 114,404 | Australia | Dec. 11, 1954 |
| 1,090,465 | France | Oct. 20, 1954 |